June 27, 1967
R. A. HANMER
3,327,796
AUTOMOTIVE VEHICLE
Filed Nov. 24, 1965
14 Sheets-Sheet 1
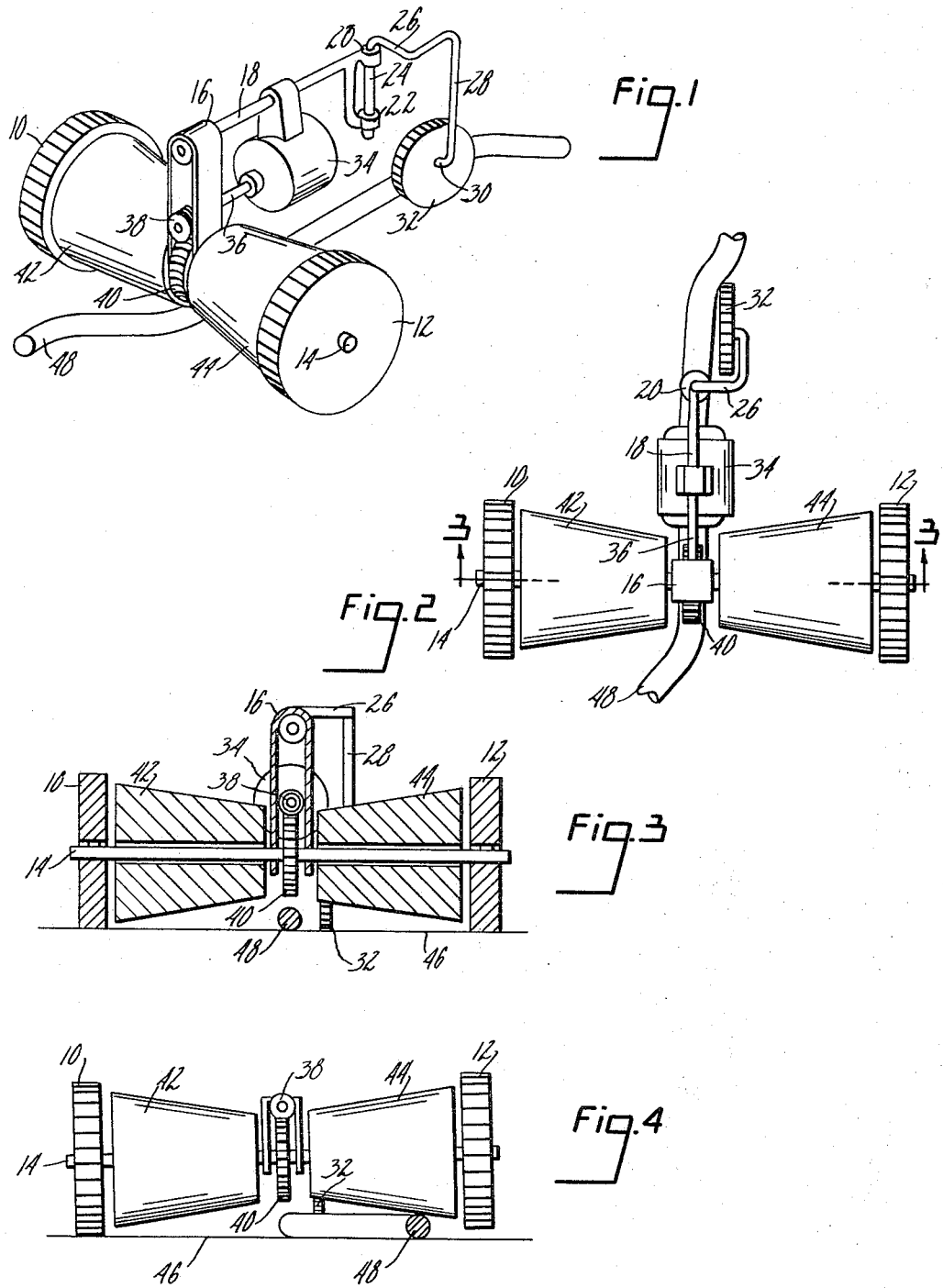

June 27, 1967   R. A. HANMER   3,327,796
AUTOMOTIVE VEHICLE

Filed Nov. 24, 1965   14 Sheets-Sheet 4

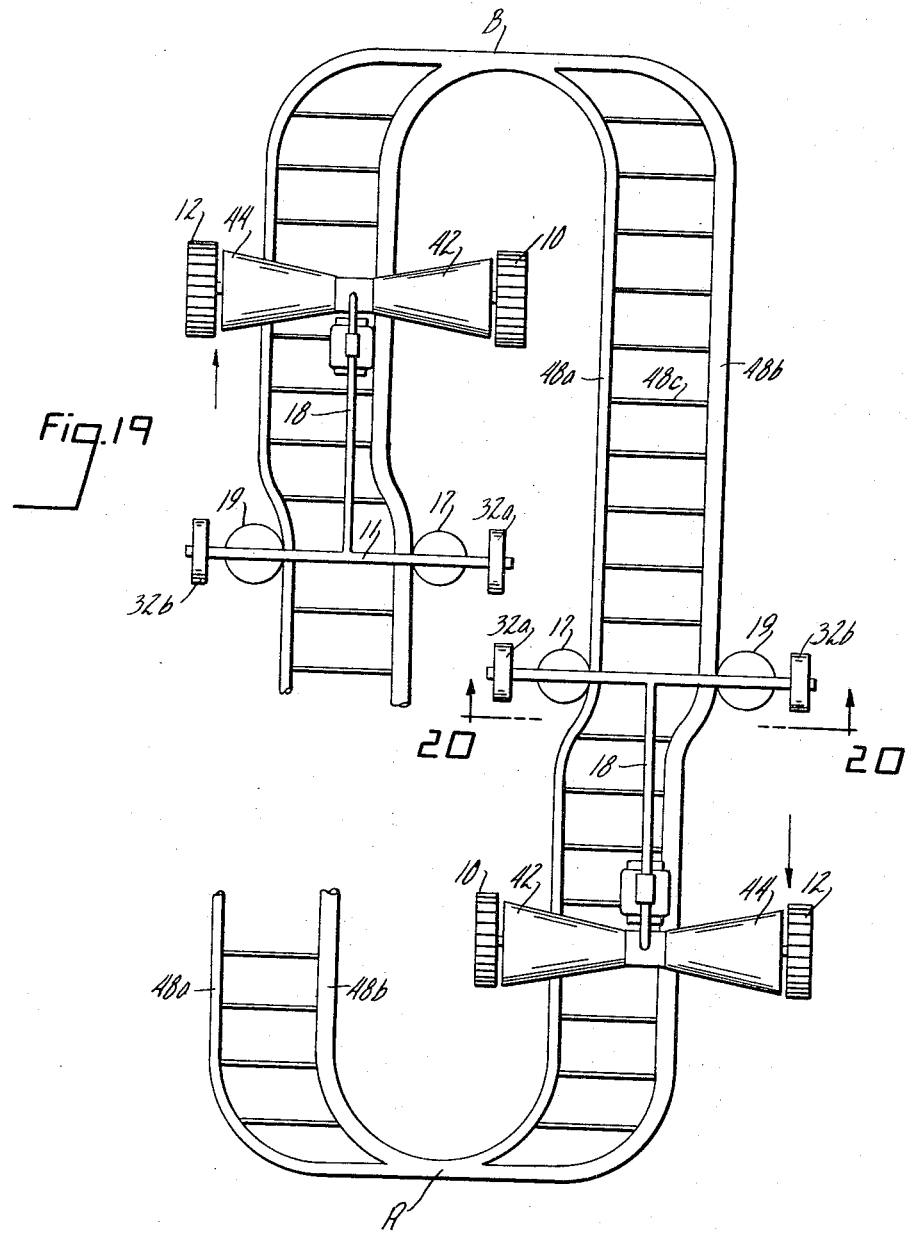

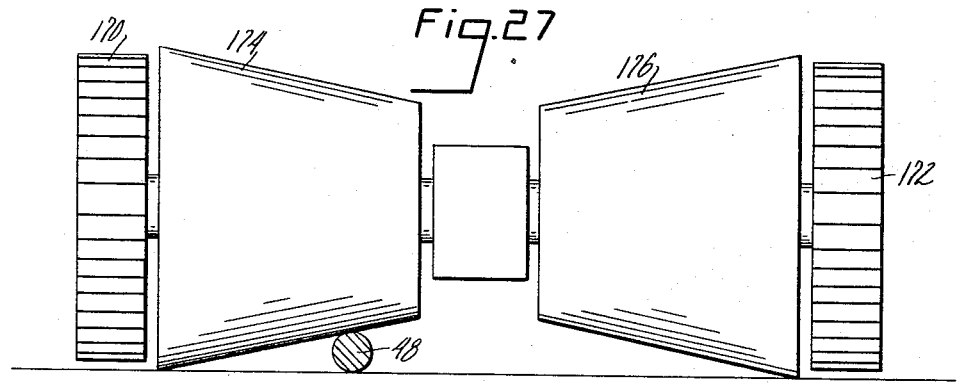
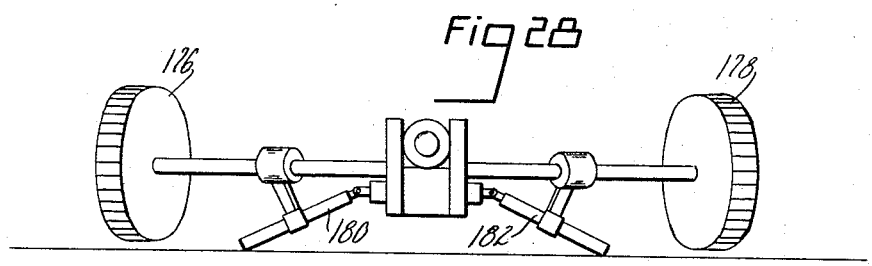
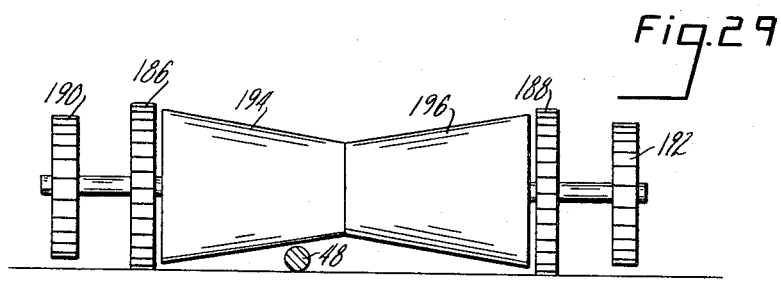

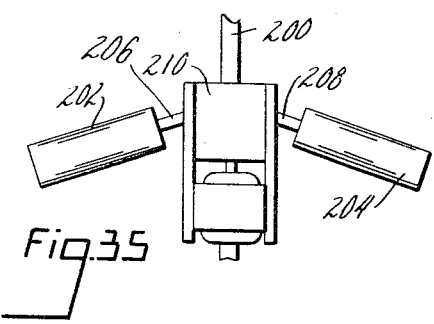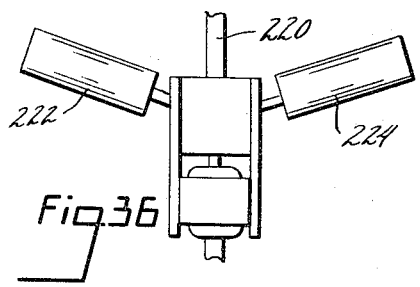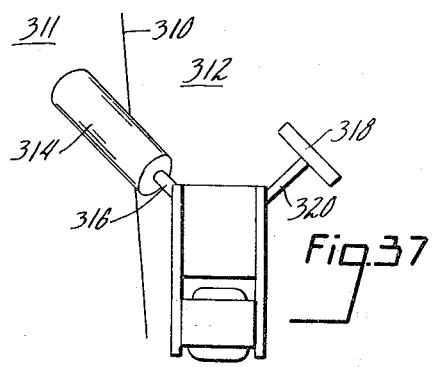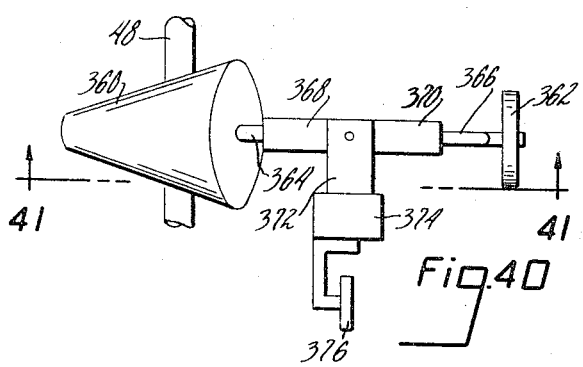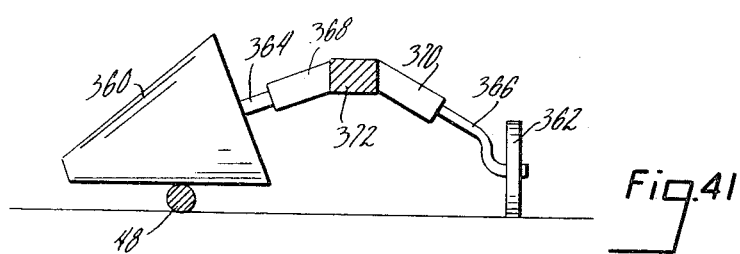

June 27, 1967  R. A. HANMER  3,327,796
AUTOMOTIVE VEHICLE
Filed Nov. 24, 1965  14 Sheets-Sheet 14
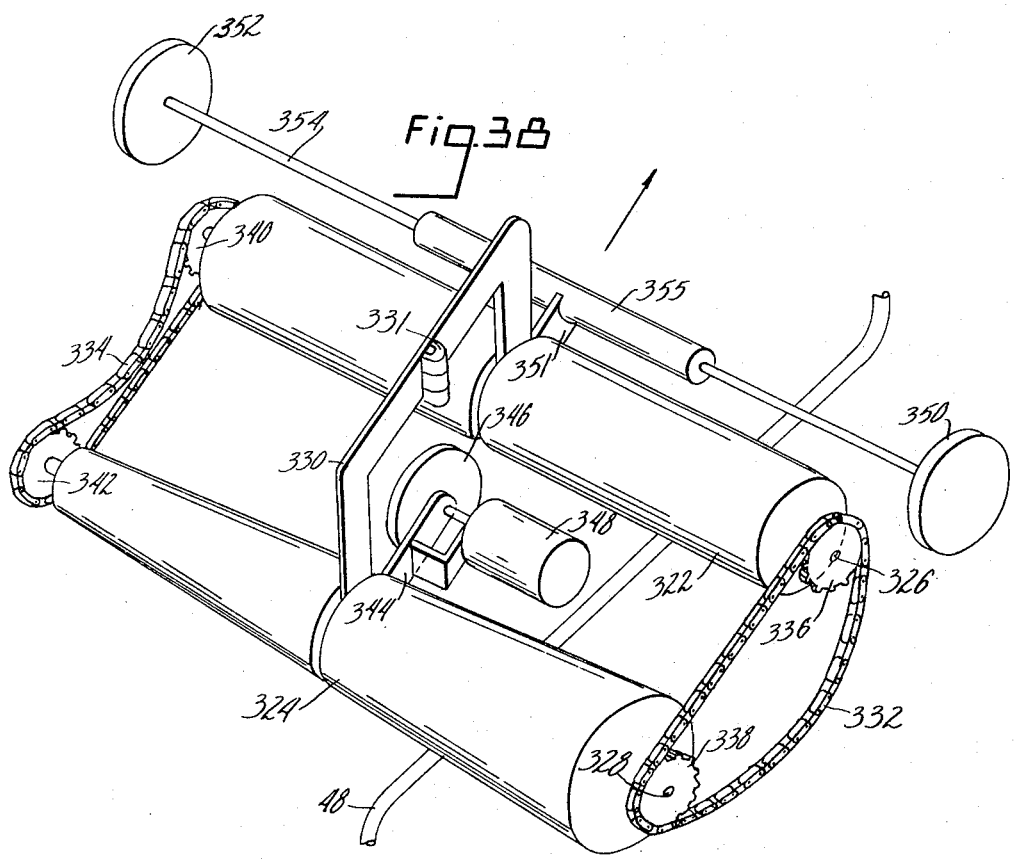
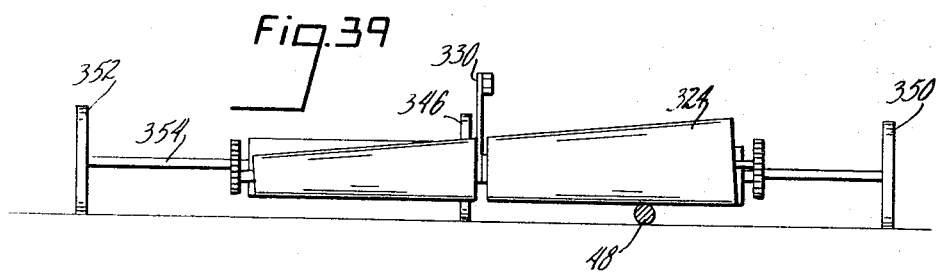

United States Patent Office 3,327,796
Patented June 27, 1967

3,327,796
AUTOMOTIVE VEHICLE
Richard A. Hammer Sedona, Ariz., assignor to The Butcher Polish Company, Malden, Mass., a corporation of Massachusetts
Filed Nov. 24, 1965, Ser. No. 509,578
32 Claims. (Cl. 180—6.54)

This application is a continuation-in-part of application Ser. No. 368,532, filed May 19, 1964, now abandoned.

This invention relates to automotive vehicles and pertains more specifically to vehicles capable of self-guidance relative to a directive variation of a surface characteristic along the surface to be traversed.

One object of the invention is to provide automotive vehicles capable of locating and self-guiding relative to a directive geometric variation such as an elongated guide element which may be either rigid or flexible and which projects above the surface to be traversed.

Another object is to provide automotive vehicles capable of self-guidance relative to a directive frictional variation on the travel surface.

Another object is to provide vehicles of the type described having sensitivity to both the position and rate of change of position of the directive variation relative to the instantaneous path of the vehicle.

A further object is to provide vehicles of the type described having controlled sensitivity ceilings and thresholds relative to various aspects of the directive variation, such as its rate of change of direction or its degree of continuity.

A further object is to provide vehicles of the type described capable of progressively generating a new guiding directive variation while guiding relative to an existing variation.

A further object is to provide vehicles of the type described capable of operating on the travel surface, and of progressively performing an operation over a wide area of the surface.

Still a further object is to provide vehicles of the type described having a decorative housing or cover rendering the vehicle useful as a toy.

Still a further object is to provide vehicles of the type described capable of automatically cleaning, waxing, buffing or performing a similar operation on a floor.

A further object is to provide specialized guide elements for use in conjunction with the vehicles described.

In one class of vehicles the invention features a digital steering system, according to which the vehicle discontinuously senses its position relative to the guiding directive variation and provides corrective steering toward the variation in response to every change in position that increases the transverse displacement of the vehicle (i.e., or an arbitrary reference point on the vehicle) from the variation beyond a selected limiting value. The sensing is discontinuous (and hence the steering digital) because position signals are not received when the transverse displacement of the vehicle from the variation is within the limiting value. In another class of vehicles the invention features a differential steering steering system in which position signals are continuously received from the travel surface and corrective steering occurs in response to every change in the relative transverse positions of the vehicle and the variation. In preferred embodiments of both classes there are one or more pairs of laterally spaced drive members and the corrective steering is accomplished by alteration of the relative effective driving modes of these members.

Other objects and features will appear from the following drawings and description.

In the drawings:

FIG. 1 is an isometric view showing one embodiment of the invention;

FIG. 2 is a plan view of the embodiment of FIG. 1;

FIG. 3 is a view in section taken along line 3—3 of FIG. 2;

FIG. 4 is a view in front of a section showing the relationship between the vehicle and the guide element, the vehicle having veered from the desired path;

FIG. 19 is a plan view partly diagrammatic showing another embodiment of the invention;

FIG. 27 is a view in front elevation of another embodiment of the invention;

FIG. 28 is a view in rear elevation showing another embodiment of the invention;

FIG. 29 is a view in front elevation showing another embodiment of the invention;

FIG. 35 is a plan view showing another embodiment of the invention;

FIG. 36 is a plan view showing another embodiment of the invention;

FIG. 37 is a plan view showing another embodiment of the invention;

FIG. 38 is an isometric view showing another embodiment of the invention;

FIG. 39 is a view in rear elevation of the embodiment of FIG. 38;

FIG. 40 is a somewhat schematic plan view of another embodiment of the invention; and FIG. 41 is a view in section taken along the line 41—41 of FIG. 40.

DIGITAL STEERERS—GEOMETRIC INTERFACE

Figure 5:
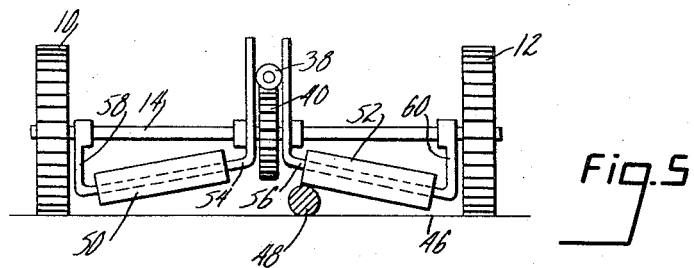
FIG. 5 is a view in front elevation showing another embodiment of the invention.

Vehicles of this class are designed to guide along a directive variation in the elevation of the travel surface, which may be a naturally occurring interface, as a ridge or a series of bumps, or may be an artificial guide element such as an elongated cord laid along the travel surface. In the devices described here, an elongated cord, loosely disposed on the travel surface, is employed as the guide element. Several specifically constructed artificial guide elements are described below.

In the embodiment shown in FIGS. 1–4 of the drawing, the vehicle comprises a pair of laterally spaced drive members in the form of wheels 10, 12 mounted at opposite sides of the vehicle fixed to opposite ends of drive shaft 14. Shaft 14 is journaled in a U-shaped frame member 16, to the upper end of which is fixed a longitudinal frame member 18 carrying at its rearward or trailing end a pair of vertically spaced journal bearings 20, 22 in which is pivotally mounted a shaft 24. Fixed to the upper end of shaft 24 is a generally horizontally disposed extension 26, which in turn is connected to a vertically extending element 28 which terminates at its lower end in a stub shaft 30 on which is rotatably mounted an idler wheel 32 which serves to support the trailing end of the vehicle in the manner of a caster.

Suspended from frame member 18 is a source of motive power such as electric motor 34, the power for which is supplied from any suitable source (not shown). Fixed to shaft 36 of motor 34 is a worm 38 arranged to mesh with worm gear 40 keyed to drive shaft 14. A pair of position sensing steering rollers 42, 44, of frustro-conical shape, are mounted for free rotation on drive shaft 14, which extends transversely of the center line of the vehicle; these rollers 42, 44 serve as load bearing members, their lower or contact surfaces sloping from adjacent the center line of the vehicle toward the travel surface 46 adjacent each side of the vehicle, as best appears in FIGS. 3 and 4, the clearance at the center being greater than the diameter of the guide element 48.

Figure 8:
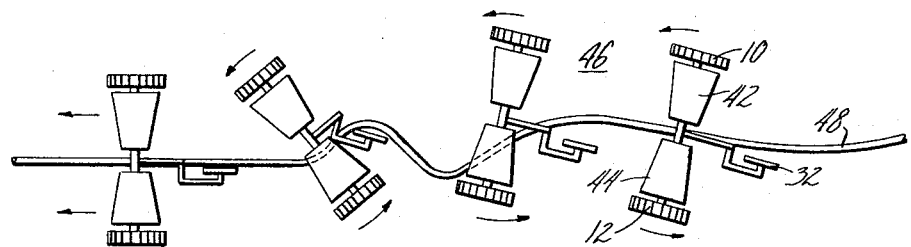
FIG. 8 is a diagrammatic view showing the manner in which the vehicle follows the turns and bends of the guide elements.

In operation, as shown in FIG. 8, the vehicle is placed anywhere on the travel surface and aimed in the general direction of a guide element in the form of a flexible cord 48, the configuration of which defines the path to be traveled by the vehicle. With the power turned on, when the vehicle reaches the cord one wheel will cross the cord before the other (unless the angle of approach is 90°), and, in a manner explained in detail below, the vehicle will assume a position straddling the cord. Consider drive wheels 10, 12 to be driven so as to advance the vehicle from right to left as seen in FIG. 8. Both drive wheels being of the same size and being driven at the same rate, the vehicle advances in a straight line until it reaches a portion of the cord 48 which is bent to the left. As soon as the centerline of the vehicle becomes sufficiently laterally displaced from the cord so that steering roller 44 comes in contact with the cord, drive wheel 12, advanced beyond wheel 10 in the desired direction of travel, is lifted out of contact with travel surface 46 by the action of roller 44 in riding up over the cord, as shown in FIG. 4 and in the second position of FIG. 8. Drive wheel 10 continues to be driven, thus tending to move the right hand side of the vehicle forward. Since a certain amount of rearward drag force against the left side of the vehicle will result from the interaction of roller 44 with the cord, a net counterclockwise torque is applied to the vehicle causing it to rotate in the direction of the cord. During this operation trailing wheel 32 acts as a caster pivoting about the upwardly directed shaft 24 and provides an additional drag force to help the vehicle rotate. When the vehicle comes to a right hand bend in cord 48, it acts in a similar manner to elevate drive wheel 10 above the travel surface, thus immobilizing the right hand side of the vehicle and causing clockwise rotation of the vehicle.

It can thus be seen that in the embodiment of FIGS. 1–4 the steering and position sensing rollers 42, 44 are inoperative and the drive wheels operate in their normal effective driving modes so long as the guide cord remains in a null position in which the lateral displacement of the vehicle center line (or some other arbitrary reference) from the cord is less than a limiting value defined by the diameter of the cord and the slope and orientation of the rollers. As soon as this limiting value is exceeded, the cord leaving the null position, the interaction of one of the rollers with the cord in effect produces a vehicle position signal that causes, as described, a selective alteration of the effective driving mode of one of the drive wheels, which results in a corrective rotation of the vehicle toward the cord.

In the embodiment shown in FIG. 5, the conical rollers 42, 44 are replaced by cylindrical rollers 50, 52 mounted for free rotation on auxiliary shafts 54, 56 which slope downwardly from adjacent the center line of the vehicle toward the travel surface adjacent each of wheels 10, 12, the outer ends of shafts 54, 56 being suspended by hangers 58, 60 from drive shaft 14. Rollers 50, 52 function in the same manner as rollers 42, 44 to raise either drive wheel 10 or drive wheel 12 out of contact with the travel surface when the vehicle veers from the desired path as defined by cord 48, thereby producing a corrective rotation of the vehicle.

Figure 9:
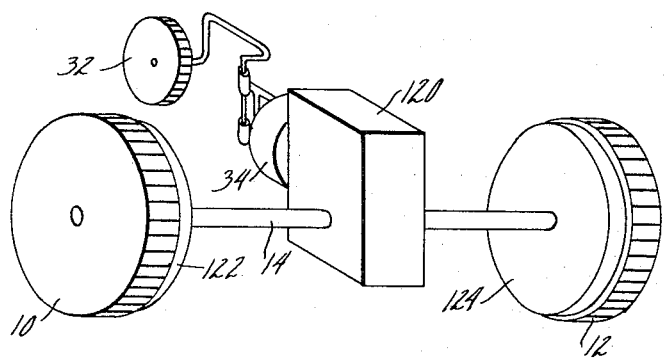
FIG. 9 is an isometric view showing another embodiment of the invention.

In the embodiment of FIG. 9 the construction is similar to that of FIG. 1 (like parts being designated by the same numerals), motor 34 driving shaft 14 through gear box 120. A pair of disk rollers 122, 124 are mounted for free rotation on shaft 14 in place of conical rollers 42, 44; these disk rollers are significantly smaller in diameter than drive wheels 10, 12 and perform the same function with respect to the guide element as the conical rollers.

Figure 10:
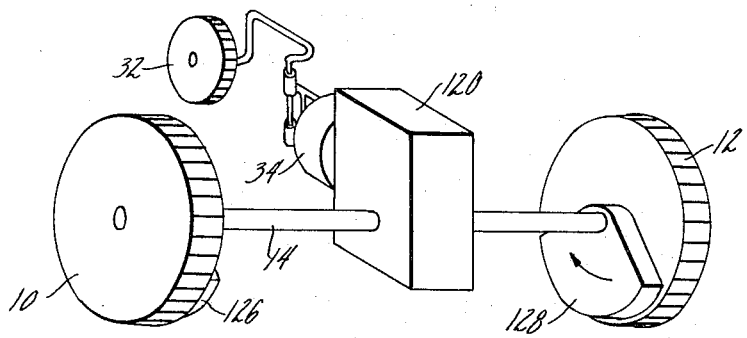
FIG. 10 is an isometric view showing another embodiment of the invention.

The embodiment of FIG. 10 is similar to that of FIG. 9 except that the upper, non-functional portions of the disk rollers has been eliminated, leaving sector rollers 126, 128 swinging freely from shaft 14 to function in the same way as disk rollers 122, 124. Interestingly, the elimination of part of the disk rollers improves the ability of the vehicle to correctively rotate toward the cord. Since the sectors 126, 128 act as pendulums, they are swung into a higher energy state (in the direction of the arrow on sector 128) upon riding up on the cord. Then, as the pendulum returns to a lower energy state, a force is applied to the cord having a component in the direction of motion. The reaction force against the raised side of the vehicle acts as a drag force to improve vehicle rotation.

Figure 11:
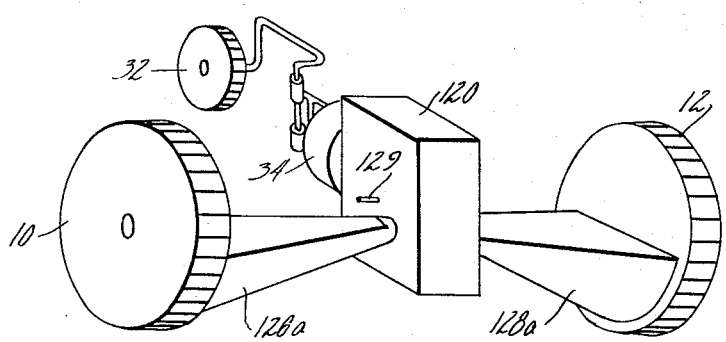
FIG. 11 is an isometric view showing another embodiment of the invention.

In the embodiment of FIG. 11 the sector rollers 126, 128 are replaced by frustro-conical sectors 126a, 128a, increasing the pendulum effect. Stops 129 limit the upward rotation of the rollers. These stops produce an additional drag force while the pendulum roller is in its higher energy state, causing it to slide along the cord 48.

The embodiments of FIGS. 10, 11, with or without the stops, are very useful on downhill travel surfaces, where a large drag force is needed to effect corrective steering in the face of gravitational force tending to move the vehicle straight ahead.

Figure 12:
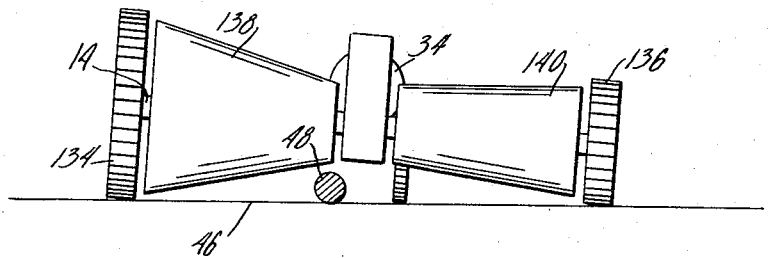
FIG. 12 is a view in front elevation showing another embodiment of the invention.

The embodiment of FIG. 12 includes drive wheels 134, 136 of unequal diameter fixed to drive shaft 14, and matching conical rollers 138, 140. This device tends to turn constantly in one direction in operation, so that if by accident it loses the guide element 48 it will travel in a circular path until retrieved.

Figure 13:
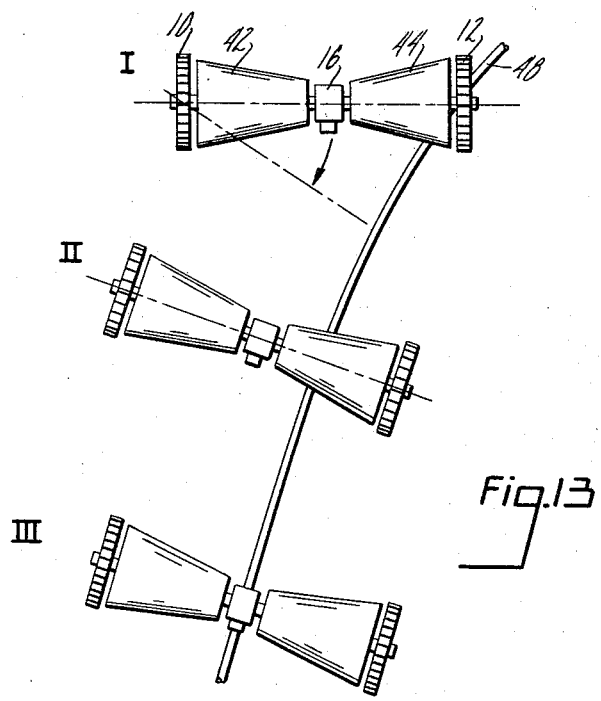
FIG. 13 is a diagrammatic view showing the manner in which a vehicle will pick up the guide element upon approaching it at other than a right angle.

The manner in which a vehicle (the embodiment of FIGS. 1–4 being used for illustration) can pick up the cord if it approaches it at any angle other than 90° is shown in FIG. 13. In position I wheel 12 has just crossed the cord and is raised off the travel surface. Since the vehicle will always tend toward its lowest energy state, the cone will tend to roll on the cord so as to reduce its elevation, producing a rotation of the vehicle in the direction of the arrow until the vehicle axis is perpendicular to the cord, as indicated by the broken line. During this operation the normal steering of the vehicle, which would produce a counterclockwise rather than clockwise rotation, is overpowered, until the vehicle reaches position II, roughly perpendicular to the cord, at which time the normal steering takes over until, eventually, the vehicle is centered on the cord as shown in position III.

Figure 14:
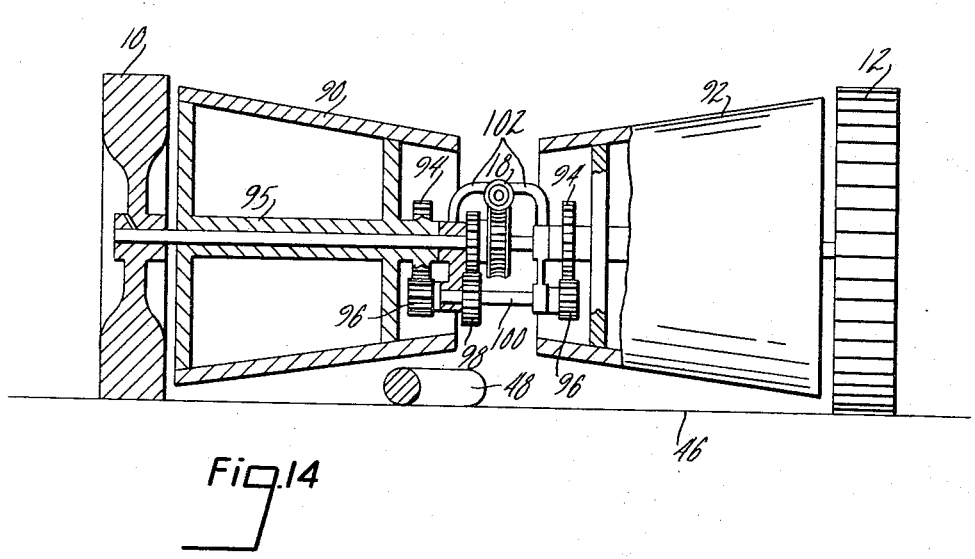
FIG. 14 is a view in front elevation partly broken away showing another embodiment of the invention.

The embodiment of FIG. 14 is similar to that of FIG. 1 except that the conical rollers 90, 92 are themselves driven in the same direction as the drive wheels 10, 12 but at a slower peripheral speed by means of gears 94, 94, 96, 96, 98. Gears 94, 94 are secured to sleeve shafts 95 which in turn are secured to rolls 90, 92. Gears 96, 96, 98 are keyed to stub shaft 100 which in turn is supported in bearings secured to frame 18 by support members 102, 102. In operation, this device follows a cord 48 in the same way as the embodiment of FIG. 1 except that the changes in direction when one drive wheel or the other is raised out of driving contact with the ground are not so abrupt because the difference in speed between the drive wheels and the conical rollers is not so great. The effect is that the vehicle will tend to ignore bends in the cord sharper than a certain ceiling value dependent upon the specific dimensions and driving speeds of the rollers and wheels.

Figure 15:
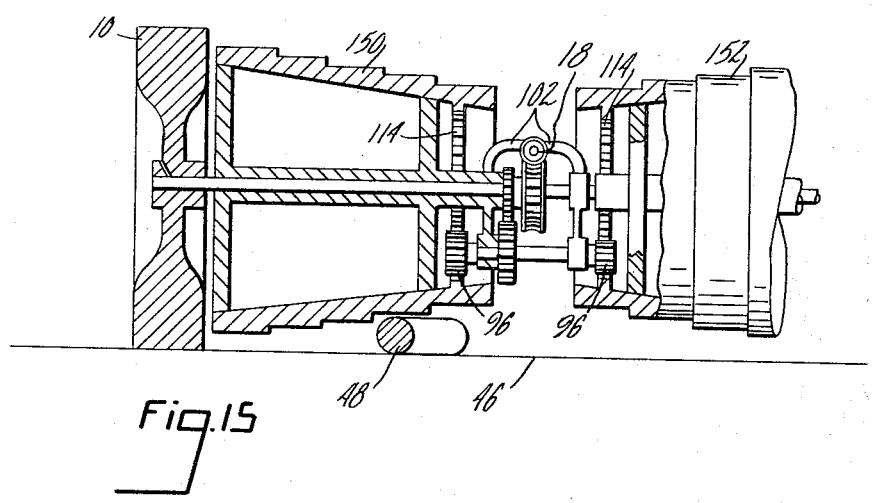
FIG. 15 is a view in front elevation partly broken away showing another embodiment of the invention.

The embodiment of FIG. 15 is similar to that of FIG. 14, except that the conical rollers 150, 152 are of stepped configuration and are driven in a direction opposite to that of drive wheels 10, 12 by means of ring gears 114, 114 secured to the conical rollers and driven by gears 96, 96. The steps in the rollers affect the limiting value of lateral displacement between vehicle and cord permitted before corrective rotation occurs. For cords of most diameters these rollers permit a divergence from the desired course greater than do the smooth faced rollers. The reverse rotation of the rollers (this feature being independent of the stepped configuration) provides for more rapid course corrections, thus raising the ceiling on the sharpness of guide element bends to which the device is sensitive.

Figure 16:
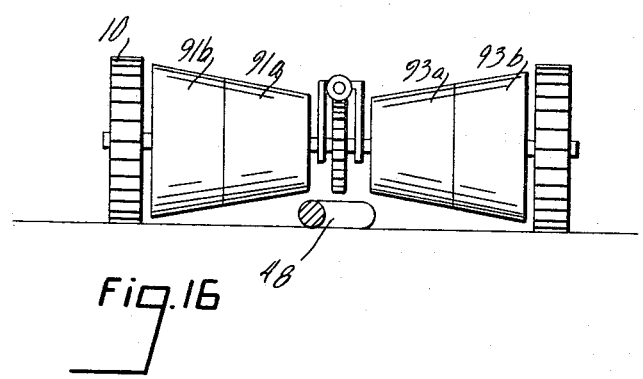
FIG. 16 is a view in front elevation showing another embodiment of the invention.

In the embodiment of FIG. 16 the rollers are in separately driven segments 91a, 91b, and 93a, 93b. Each segment is individually driven by means of its own gear in a manner analogous to that shown in FIG. 14. The inner rollers 91a, 93a are driven at a higher angular speed than the outer rollers but lower than the drive wheels, and are capable of sensing and steering along relatively smooth bends in the guide cord. Outer rollers 91b, 93b are driven at a speed less than that of the drive wheels and will steer the vehicle along bends sharper than the sensing ceiling of rollers 91a, 93a. Other combinations of rollers and driving speeds are possible.

Figure 17:
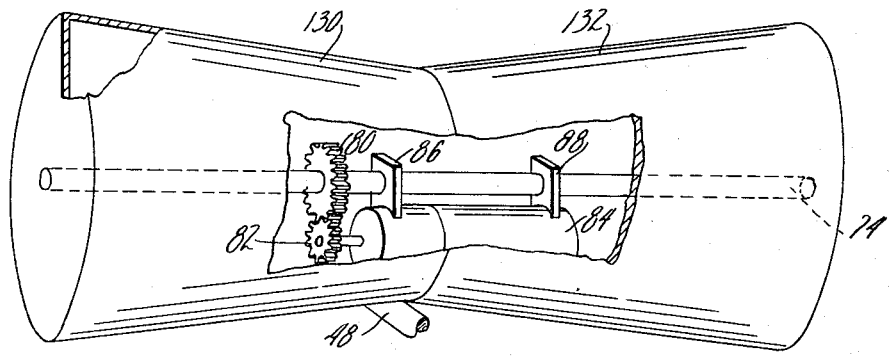
FIG. 17 is an isometric view partially broken away showing another embodiment of the invention.

In FIG. 17 the drive wheels and position sensing cones are combined into integral cone shaped members 130, 132, joined together at their junction. In effect this embodiment is equivalent to that of FIG. 14 with the cones driven at the same angular speed as the wheels. Despite the constancy of angular speed, corrective rotation is still provided by the fact that the effective driving radii of the members 130, 132, and hence their effective peripheral driving speeds, decrease toward the center line of the vehicle. Drive shaft 74 is driven through gears 80, 82 from a motor and battery 84 suspended from shaft 74 by means of hangers 86, 88, the motor being free to swing by gravity from the shaft. In operation, the motor is swung forwardly and upwardly by the interaction of the gears, and the gravitational force tending to return it to its lowermost position provides the driving force.

The embodiment of FIG. 17 has a very low sensitivity ceiling relative to the sharpness of guide element bends. Even lower ceilings could be obtained if the cones of FIG. 14 were run at angular speeds higher than that of the drive wheels, but still low enough so that the effective peripheral driving speed of the cones near the vehicle center line remained below that of the wheels. Such a device would tend to turn away from the cord once the bend ceiling was exceeded, since the outer parts of the cones would have effective peripheral driving speeds greater than that of the drive wheels.

Figure 18:
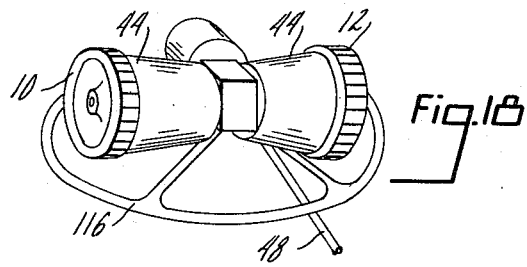
FIG. 18 is an isometric view showing another embodiment of the invention.

The embodiment of FIG. 17 is shown without a stabilizing drag wheel, a substantial amount of drag being supplied by the driven cones themselves. Of course, a drag wheel could be employed. FIG. 18 shows an annular skid 116 as a substitute for a castered drag wheel of the embodiment of FIG. 1.

Figure 6:
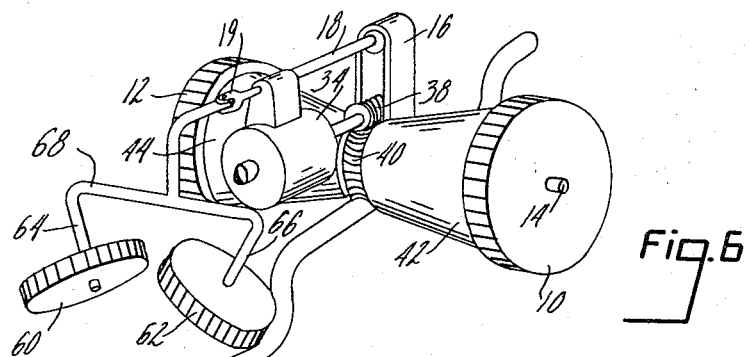
FIG. 6 is an isometric view showing another embodiment of the invention.
Figure 7:
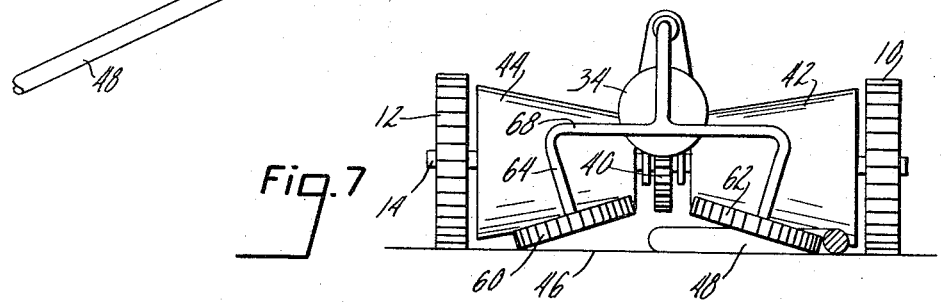
FIG. 7 is a view in rear elevation over the embodiment of FIG. 6.

The embodiment of FIGS. 6 and 7 is similar to that of FIGS. 1–4, but is capable of generating a new guiding directive variation while following an existing variation. It accomplishes this by automatically laterally displacing the cord 48. To this end caster wheel 32 is replaced by a pair of idler rollers 60, 62 mounted on a pair of shafts 64, 66 fixed at opopsite ends of a spreader 68 which is in turn secured to frame member 18 by a pivot connection 19. Shafts 64, 66 diverge laterally upwardly so that only the outer margin of each roller 60, 62 is in contact with the travel surface. At the beginning of each trip the vehicle is disposed with respect to cord 48 as shown in FIG. 6. Consequently, as the vehicle advances to the right, as seen in FIG. 6, the cord 48 is displaced to the right by the action of idler roller 62 immediately after the drive wheels and the main body of the vehicle have passed over it. As a result, the cord 48 is displaced or translated laterally after each trip to a new position which is parallel to, but spaced from, its original position. This feature is of advantage, for example, when the vehicle is employed as the motive power for a machine carrying out an operation on a traveled surface, as for example, a floor cleaning operation, since it enables the machine to cover an extensive floor area completely in successive trips without the necessity for manually changing the position of the guide element after each trip.

Figure 20:
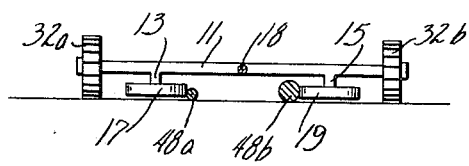
FIG. 20 is a view in section taken along 20—20 of FIG. 19.

In FIGS. 19 and 20 the concept of automatic regeneration of the guiding directive variation is combined with a special cord configuration to produce a device capable of automatically and systematically traversing the entire area of a travel surface. The usual arrangement of free cones 42, 44 and drive wheels 10, 12 is connected pivotally through shaft 18 to axle 11, which supports a pair of spaced trailer wheels 32a, 32b, and, inwardly of the trailer wheels, on vertical shafts 13, 15, a pair of horizontal freely rotatable cord displacing rollers 17, 19. Rollers 17, 19 are elevated slightly above the travel surface, and are spaced symmetrically about the center line of the vehicle. The double loop guidance cord consists of a relatively small diameter cord 48a and a relatively large diameter cord 48b. The two cords form a pair of continuous overlapping loops having junctions at A and B, and are joined by stiff ladder-step cord segments 48c. The lateral spacing between the loops is equal to the distance between displacing rollers 17, 19.

In operation, the vehicle will guide itself straddling the two loops with its center line always displaced toward the larger diameter cord 48b, thus causing the displacing rollers to continuously displace the pair of loops from left to right as seen in FIG. 19, when the vehicle is traveling in the direction of the arrow. The vehicle will in this manner cover the entire travel surface along a spiral path.

Figure 21:
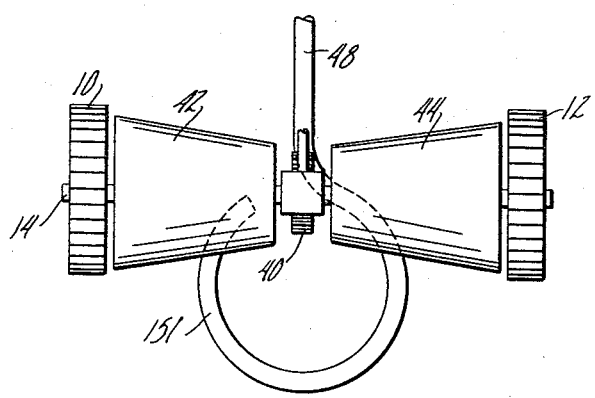
FIG. 21 is a plan view showing another embodiment of the invention.
Figure 22:
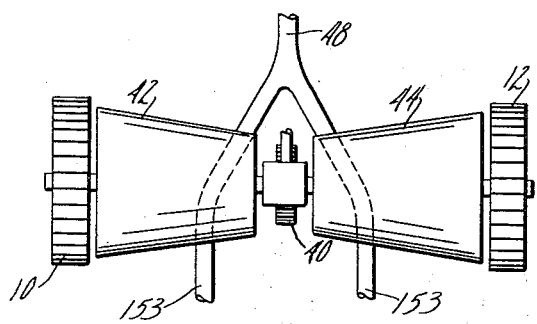
FIG. 22 is a plan view showing another embodiment of the invention.
Figure 23:
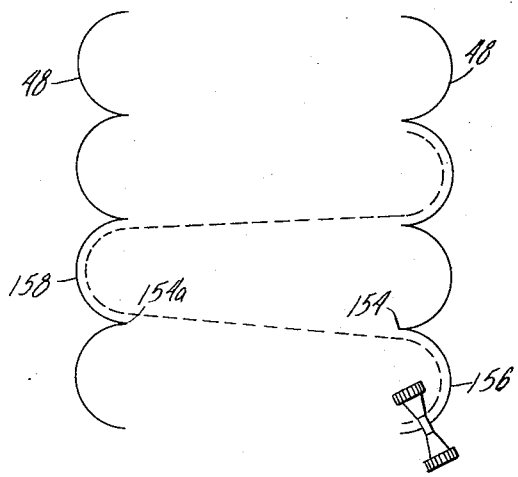
FIG. 23 is a plan view showing another embodiment of the invention.

Several other special cord configurations are shown in FIGS. 21–23. In FIG. 21 the end of the cord is a circle 151. If the diameter of terminal circle 151 is such that both sensing rollers will just contact the cord without lifting the driving wheels from the travel surface, the vehicle will always pass directly over the center of the circle 151 and will leave the circle in a random direction.

In FIG. 22 the terminal circle is replaced with a Y-shaped configuration 153, which will act as an arrow to send the vehicle off in the direction indicated. The width requirements for the wide end of configuration 153 are the same as those for the diameter of circle 151.

In FIG. 23 a pair of cords 48 are arranged in scalloped form at opposite sides of a room, with the points 154, 154a of the scallops directly opposite each other. If the sensitivity ceiling of the vehicle relative to cord bends is lower than the angle at the scallop points, the vehicle will follow scallop 156 on the right hand cord, leave that cord at point 154, cross the room to the other cord and pick it up at point 154a, follow scallop 158, and in this manner systemmatically cover the entire floor. If the vehicle is towing a buffer, e.g., the entire floor will be automatically buffed.

Figure 24:
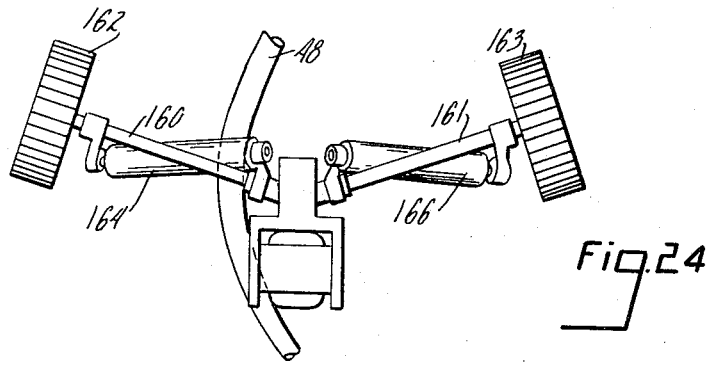
FIG. 24 is a plan view showing another embodiment of the invention.
Figure 25:
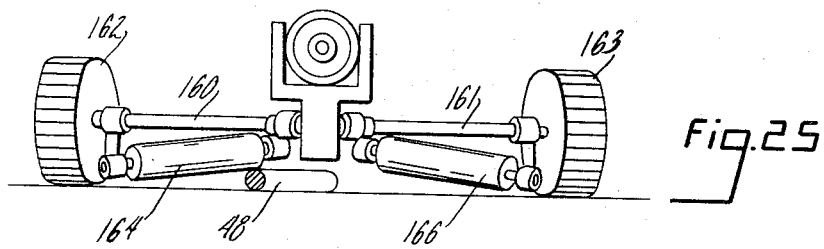
FIG. 25 is a view in rear elevation of the embodiment of FIG. 24.

The embodiment of FIGS. 24 and 25 differs from those discussed thus far in that the digital steering is accomplished by discontinuous corrective translations of the vehicle toward the cord, rather than corrective rotations. Drive wheels 162, 163 are toed-in toward the center line of the vehicle, by virtue of dihedraled axles 160, 161. Steering rollers 164, 166 are disposed inwardly of the drive wheels, with the axis of roller 164 parallel to that of wheel 163, and that of roller 166 parallel to that of wheel 162. The rollers are freely rotating and tilted to form surfaces inclined from the wheels upwardly toward the vehicle center line. In operation, when the vehicle becomes sufficiently laterally displaced from the guidance cord, one of the steering rollers will ride up on the cord and, together with the opposite parallel wheel, will cause the vehicle to translate along a straight line toward the cord.

Figure 26:
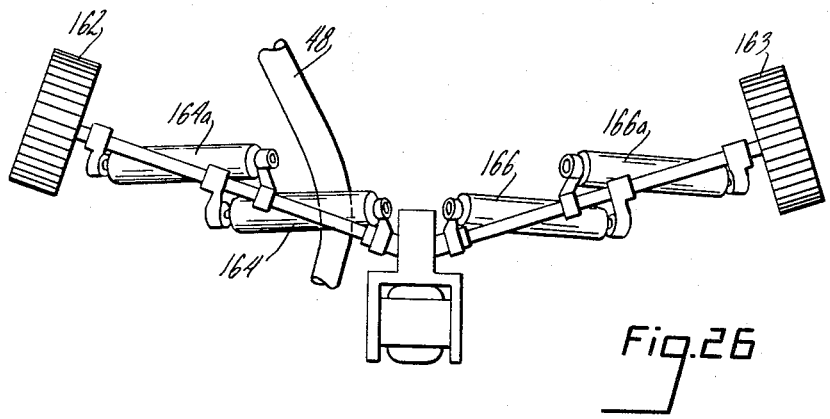
FIG. 26 is a plan view showing another embodiment of the invention.

By adding second rollers 164a, 166a, as shown in FIG. 26, additional stability is obtained.

If a drag wheel is added to the embodiment of FIG. 26 the resulting corrective steering is a combination of translations and rotations. Similar combinations of rotation and translation are obtained if the rollers of FIGS. 24–26 are powered rather than freely rotatable.

In the embodiments considered thus far, the steering is accomplished by selectively modifying the effective driving mode of one of two spaced driving members in such a manner as to create a loss of effective driving traction in one driving member relative to the normal effective driving mode of the other driving member. In the following embodiments steering is accomplished by driving mode modification such as to create a gain in effective driving traction relative to the normal mode.

The device of FIG. 27 is similar to that of FIG. 14, except that the diameter of wheels 170, 172, is infinitesimally smaller than the maximum diameter of the driven steering cones 174, 176. Thus, when not in contact with the guide cord, the vehicle will ride on the wide ends of the cones. When the lateral displacement of the cord from the vehicle is sufficient to cause, say, cone 174 to ride up on the cord, the opposite wheel 172 will be moved into driving contact with the travel surface by transverse tilting of the entire vehicle. Since the wheels are moving at a faster angular speed than the cones, the result will be an increase in the forward speed of the right side of the vehicle, producing a corrective rotation in the direction of the cord.

The corrective steering in the device of FIG. 28 is translational rather than rotational, the toed-in wheels 176, 178 normally riding slightly off the travel surface and driven at the equal speeds. Powered rollers 180, 182 are driven at a slower peripheral speed than the wheels, through conventional shaft and gear arrangements, and their axes are respectively parallel to those of wheels 178 and 176. When either roller rides up on the cord, the opposite wheel will come into driving contact with the travel surface, producing a corrective translation toward the cord.

A combination of the traction gain and traction loss principles is embodied in the device of FIG. 29. Wheels 186, 188 normally drive the vehicle. Outer wheels 190, 192 are slightly smaller than and are driven faster than wheels 186, 188. Conical rollers 194, 196 are driven slower than wheels 186, 188, and may even be free rollers. The vehicle steers by digital corrective rotations toward cord 48, produced by a loss of effective driving traction on one side coupled with a simultaneous gain in effective driving traction on the other side.

Figure 30:
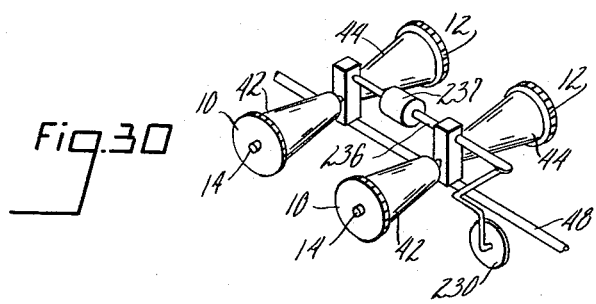
FIG. 30 is an isometric view showing another embodiment of the invention.

In the embodiment of FIG. 30, a pair of free cone and drive wheel arrangements of the type shown in FIG. 1 are coupled together, and a single drag wheel 230 is provided at the rear of the vehicle. Front and rear axles 14, 14 are geared together by drive shaft connector 236, which is in turn driven by motor 237. The front and rear cone sets are identically structured and oriented and all wheels are driven at the same speed. In operation, corrective digital steering will not occur until both cones on one side of the vehicle ride up on the cord. Thus, the device is capable of discriminating between a continuous guide element and, e.g., a series of bumps on the travel surface insufficiently long to simultaneously raise both a front and a rear cone. Hence, a threshold sensitivity relative to the degree of continuity of the guide element is obtained by virtue of the double set of position sensing steering rollers. In addition, the double set of drive wheels prevents the vehicle from stalling in the event both front wheels are lifted out of driving traction, e.g., by a cord configuration of the general type shown in FIGS. 21 and 22.

Figure 31:
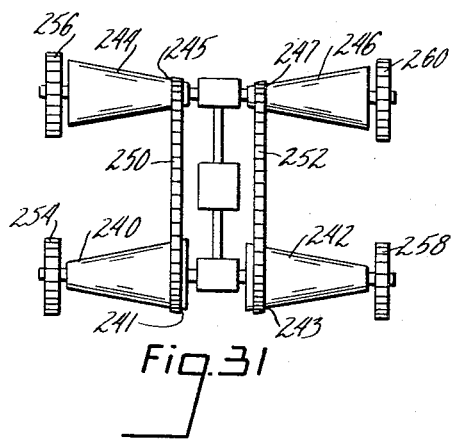
FIG. 31 is a plan view showing another embodiment of the invention.

The embodiment of FIG. 31 is superficially similar to that of FIG. 30 in that the front and rear axles are driven together through a connecting drive shaft so as to drive all four wheels at the same peripheral speed. However, the rear free cones 240, 242 taper outwardly whereas the front free cones 244, 246 taper inwardly. In addition, cones 240 and 244 are coupled together by bead chain 250 riding in grooves 241 and 245 at the inner ends of the cones, and cones 242 and 246 are coupled by chain 252 riding in similarly located grooves 243 and 247. The taper of the cones is sufficiently small so that, despite the reverse direction of taper the cord will be in contact with both a front and rear cone whenever it deviates from the null position adjacent the center line of the vehicle. There is no rear drag wheel in this embodiment. In operation, when the cord deviates, say, to the left, out of the null, cones 240 and 244 ride up on the cord and raise drive wheels 254, 256 from the travel surface. In the absence of the chain 250, cones 240, 244 would roll freely and there would be insufficient drag to overcome the forward driving tendency of the longitudinally spaced drive wheels 258, 260, and the vehicle would not turn. However, chain 250 requires cones 240, 244 to rotate at equal peripheral speeds at grooves 241, 245. Thus, at every point to the left of groove 241 the peripheral speed of cone 240 increases, and at every point to the left of groove 245 the peripheral speed of cone 244 decreases. Hence, the chain 250 marks the leftward boundary of the null zone, and if the cord is in contact with cones 240, 244 to the left of chain 250 the two cones will be required to rotate at unequal peripheral speeds relative to the cord, causing slippage or locking of the cones against the cord. This locking effect produces a resultant drag force against the vehicle, and hence causes the desired leftward corrective rotation of the vehicle. The sharper the bend in the cord, the greater will be the difference in peripheral speeds of cones 240 and 244, increasing the drag force and hence the sharpness of the corrective turning of the vehicle. Thus, this vehicle is sensitive not only to its lateral position relative to the guide element, but is also sensitive to the rate of change of the position of the guide element relative to the instantaneous path of the vehicle. While frustro-conical free rollers are shown in FIG. 31, other shapes are possible, the important feature being that the front and rear rollers are coupled together and have their effective driving radii relatively arranged to produce different peripheral speeds and hence a drag locking against the guide element.

Figure 32:
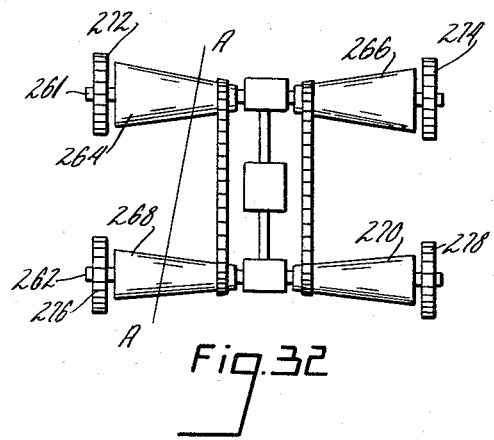
FIG. 32 is a plan view showing another embodiment of the invention.

FIG. 32 shows another chained roller embodiment of the invention, in which the hunting characteristics of the vehicle are damped. In this embodiment the axle system is the same as shown in FIGS. 30 and 31 except that the front axle 261 is geared to rotate at a lower angular speed than the rear axle 262. Both front and rear conical rollers taper down toward the center line of the vehicle, as in the embodiment of FIG. 30. However, the degree of taper of the front cones 264, 266 is greater than that of the rear cones 268, 270. Cones 264, 266 are of larger maximum diameter than cones 268, 270, and front drive wheels 272, 274 are larger than rear drive wheels 276, 278. The difference in drive wheel diameter exactly compensates for the lower speed of axle 261 producing equal effective peripheral driving speeds for all four drive wheels. In addition to the usual null zone between and at the chains, this vehicle has in effect a steering null whenever the guide cord passes under points of equal peripheral speed on the front and rear cones, as e.g., line A—A, since in any such position there will be no drag locking. Whereas in the vehicles previously described corrective steering, once begun, will continue until the guide element returns to the null between the sensing rollers, resulting in substantial hunting of the vehicle, the embodiment of FIG. 32 reaches a steering null at an earlier stage while the sensing rollers are still in contact with the cord, and the amplitude of hunting is reduced.

Figure 33:
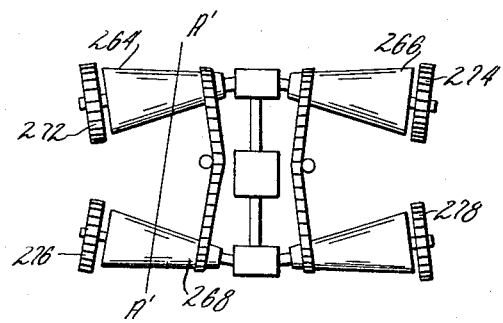
FIG. 33 is a plan view showing another embodiment of the invention.

In the embodiment of FIG. 33 hunting is even further reduced by toeing the front drive wheels out and toeing the rear drive wheels in. In all other respects, this embodiment is identical to that of FIG. 32. The net effect of the drive wheel toeing is to produce clockwise and counterclockwise rotational forces that cancel each other when the vehicle is not in contact with the cord. In operation, considering for example a leftward bend in the guide cord, when cones 264, 268 ride up on the cord, the drag locking is strong enough to overcome the clockwise rotational tendency of drive wheels 274, 278, and corrective steering occurs. However, as soon as the cord reaches a drag or steering null position such as line A'—A', passing under rollers 264 and 268 at points of equal peripheral speed, drag locking disappears and drive wheels 274, 278 cause a clockwise vehicle rotation. Thus, by the time the cord returns to the original null between the cones, the vehicle path will have approached the direction of the cord, thereby reducing hunting.

Figure 34:
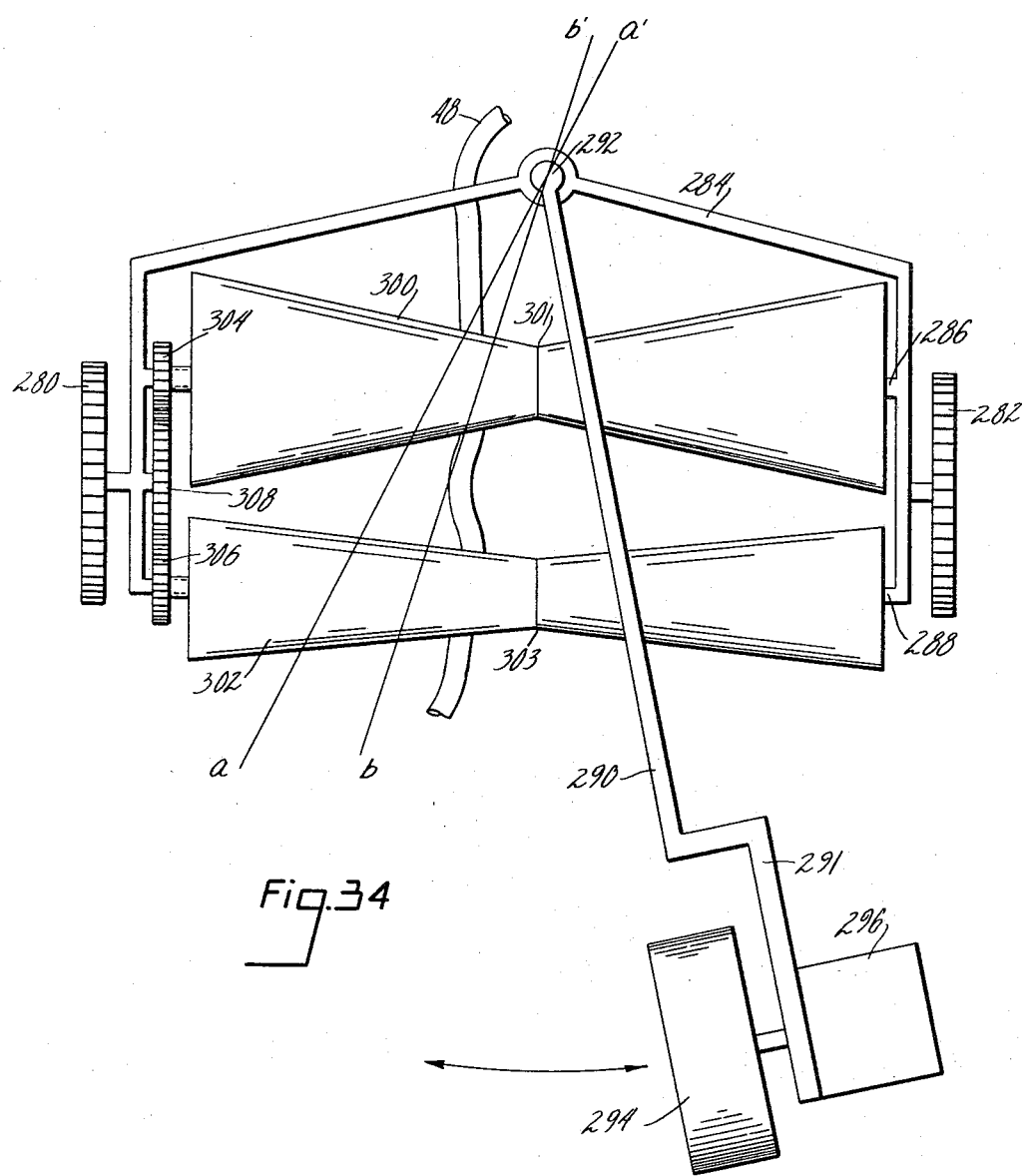
FIG. 34 is a plan view showing another embodiment of the invention.

In the embodiment of FIG. 34, the vehicle rides on a pair of idler wheels 280, 282, supported by frame 284, and is driven from the rear by drive wheel 294 powered by motor 296. Driving tongue 290 couples the drive wheel to the frame 284 through a ball bearing connection (allowing three degrees of freedom) 292 at the front center of the vehicle. The rear of the tongue is offset at 291 so that the driving force vector always passes through bearing 292. Conical rollers 300, 302, each consisting of two inwardly tapering frustro-conical surfaces meeting at a waist 301, 303, are respectively supported for idling by frame axles 286, 288. The rollers have equal radii at their waists 301, 303, and are coordinated by gears 304, 306, 308 to rotate at equal angular speeds. However, the slope of roller 300 is greater than that of roller 302.

By virtue of the arrangement just described there exists a set of steering or drag null lines, e.g., $a$–$a'$, $b$–$b'$, converging at the front of the vehicle. These, of course, are lines joining points of equal radii (and hence peripheral speed) on the two cones. If the dimensions of the frame are adjusted appropriately (with the ratio of the distance between axles 286, 288 to the distance between bearing 292 and axle 286 exceeding by one the ratio of the slope of cone 300 to that of cone 302) the null lines will converge at bearing 292.

In operation, if the cord veers, e.g., to the left, as in FIG. 34, contacting cones 300, 302 at other than a steering null, the drag resulting from unequal peripheral speeds of the cones will cause a leftward rotation of the vehicle, until the driving tongue coincides with the set of cord-cone contact points, which points will then lie on a steering null line. At this point the drag vanishes ending the corrective rotation, though only instantaneously. The vehicle rolls at an angle to the cord and, as the cord approaches the vehicle center line, it passes out of the steering null, since the null lines are non-parallel to each other. The resulting drag force now is applied to the vehicle at the right of the driving tongue, causing a rightward rotation tending to align the vehicle with the cord. The leftward and rightward rotations recur in the usual hunt pattern, with the driving tongue always tending to align with the set of cord-cone contact parts. Eventually, both cord and tongue are adjacent waists 301, 303 and the vehicle moves straight ahead. If the bearing 292 is moved closer to the axles, sensitivity of the vehicle is increased, at the cost of increased hunting, and sensitivity and hunting are both reduced by moving the bearing farther out in front of the axles.

DIGITAL STEERERS—FRICTIONAL INTERFACE

The following devices are illustrative of vehicles designed to steer digitally relative to a directive frictional variation such as that created by a strip of the travel surface that is either stickier or more slippery than the adjacent portions of the surface. Selective modification of effective driving mode is accomplished through modification of the friction characteristics of the portion of the travel surface in contact with the driving member.

The embodiment of FIG. 35 follows a strip 200 of sticky material that has been applied to the travel surface. Identical cylindrical drive rollers 202, 204 ride flat on the travel surface and are mounted respectively on dihedraled axles 206, 208, driven at equal angular speeds with the vertex 210, formed by the axles, pointing in the direction of travel. When guide strip 200 is in the null position between the rollers, the vehicle moves straight ahead by virtue of the vector addition of the leftward and rightward translational forces respectively created by rollers 202 and 204. Since the rollers cannot roll in the direction of travel, they slide or scrub along the travel surface. If the strip deviates, say, to the left, sufficiently to pass under roller 202, the effective traction of that roller will be increased, causing the vehicle to correctively translate toward the guide strip.

In FIG. 36, guide strip 220 is more slippery than the adjacent travel surface, comprising, e.g., a Teflon strip embedded in the travel surface, or perhaps a buffed strip on a floor to which wax has been applied. Drive rollers 222, 224, driven at equal speeds are dihedraled so that the axle vertex points rearwardly. Left hand roller 222 tends to translate the vehicle to the right (as well as ahead, of course), and right hand roller tends to translate the vehicle to the left. When the strip 220 is at the null position the translational tendencies add up to forward motion, but deviation of the guide strip out of the null produces a decrease in effective driving traction under one roller, which results in a corrective translation of the vehicle toward the guide strip.

DIFFERENTIAL STEERERS

Differential steering vehicles receive a continuous position signal relative to the guiding directive variation and tend to reverse every change in the lateral displacement of the vehicle (i.e., an arbitrary reference on the vehicle) from the variation.

The embodiment of FIG. 37 guides relative to a directive frictional variation 310 between a sticky surface 311 and a slippery surface 312. Cylindrical drive roller 314 rides flat on the travel surface and is mounted on axle 316. Axle 320 is dihedraled relative to axle 316, with the vertex pointing rearwardly of the direction of travel, and carries drive wheel 318. Depending upon the relative radii and angular speeds of roller 314 and wheel 318, at some position of the directive variation under the roller the respective leftward and rightward tendencies of the wheel and roller will be in equilibrium, producing forward motion with cylinder 314 sliding or scrubbing along the travel surface. Any shift of the directive variation from this equilibrium position will produce a corrective translation of the vehicle toward the variation until equilibrium is restored. It is necessary, of course, that the wheel 318 ride on the slippery portion of the travel surface; otherwise the equilibrium will be unstable. If the surface of cylinder 314 is suitable for buffing wax, the directive variation 310 may be the interface between buffed and unbuffed sections of a newly waxed floor, in which case cylinder 314 will buff a new strip of the floor as it scrubs along the interface, simultaneously generating a new directive variation for the return trip. If the initial buffed zone is circular, the device will continuously buff along a spiral path until the entire floor is buffed.

Related differentially steering frictional variation followers can be obtained by substituting cones for the cylinder or wheels of FIG. 37, in various combinations.

A differentially steering geometric variation follower is shown in FIGS. 38 and 39. Cylindrical roller 322 and conical roller 324 are attached respectively to shafts 326, 328, which shafts are supported centrally for free rotation by hinged frame piece 330 connecting the two shafts. The rollers are relatively arranged so that their lowermost surface elements are parallel to the travel surface, and are elevated from the travel surface by slightly less than the diameter of cord 48, so that both rollers will continuously contact the cord while the vehicle is moving. Shafts 326, 328 are coupled to each other at both ends, respectively by chain 332, gears 336, 338, and by chain 334, gears 340, 342. The chains are sufficiently long to allow the angle between shafts 326, 328 to be shifted substantially by the hinging action of hinged frame piece 330. The sag in chain 332 is at the bottom and that in chain 334 at the top. The diameter of the cone at frame piece 330 is equal to the diameter of the cylinder, and the cone tapers to the left as seen from behind.

The chained roller assembly is supported in its elevated position by drive wheel 346, attached to frame piece 330 through arm 344, and idler wheels 350, 352 supported by axle 354, sleeve 355 and arm 351. Drive wheel 346, powered by motor 348, is located with its point of contact with the ground directly below hinge 331, to avoid frictional resistance to the hinging action. Idler wheels 350, 352 are spaced beyond the ends of the rollers.

In operation, with the rollers riding continuously on the cord 48, the vehicle will move straight ahead so long as the cord contacts the cone and cylinder at the points of equal diameter. Should the cord turn to the left, the cone, in order to maintain, at a point of diameter smaller than that of the cylinder, a peripheral speed equal to that of the cylinder (as it must, absent slipping on the cord), increases its angular speed. Due to the opposite arrangements of the sagging sections of the two chains, the left ends of the rollers will approach each other and the right ends of the rollers will spread apart, causing the vehicle to rotate leftwardly until the cord once again returns to the equilibrium position under the hinge. The opposite hinging action will occur upon a deviation of the cord to the right.

In the differentially steering embodiments considered thus far, it will be observed that the position sensing mechanism operates by measuring the directive variation relative to a constant reference signal defining a straight ahead signal, simultaneously measuring the variation relative to a changing signal, and then subtracting the two signals to decide whether to move straight ahead or to turn. In FIG. 37 the wheel 318 provides the reference, and cylinder 314 the changing signal. In FIGS. 38, 39, the constant reference is cylinder 322 and the changing signal is received from cone 324. Many variations on this principle are possible.

In the embodiment of FIG. 40 conical roller 360 and reference wheel 362 are respectively mounted on axles 364, 366 in turn journaled in sleeves 368, 370. Frame 372, pivotally connected to said sleeves, supports motor 374 and driving tailwheel 376. Cone 360 rides flat over the travel surface in continuous contact with cord 48. The radius of wheel 362 is smaller than the maximum radius of cone 360. The cone and wheel are geared through their respective axles to rotate at equal angular speeds. Thus, when the cord is in contact with the cone at the point at which its radius equals that of the wheel, the device moves straight ahead, stabilized as well as powered by wheel 376. A leftward deviation of the cord reduces the effective radius of cone 360 relative to that of reference wheel 362, causing the vehicle to follow the cord to the left. The vehicle similarly follows a rightward deviation of the cord.

Other embodiments of the invention will occur to those skilled in the art and are within the following claims.

What is claimed is:

1. An automotive vehicle capable of guiding itself on a travel surface along a geometric directive variation projecting above said surface comprising a pair of laterally spaced apart surface-contacting drive members, means for driving both members, and steering means attached to the vehicle and having a portion spaced above said travel surface a distance less than the height of said variation above said surface to ride up on said variation when the lateral displacement of the vehicle therefrom exceeds a limiting value and to thereby raise out of driving contact with the surface that driving member which is advanced beyond the other in the desired direction of travel.

2. An automotive vehicle as claimed in claim 1, in which said steering means includes a load bearing member freely rotatable about an axis generally transverse to the center line of the vehicle.

3. An automotive vehicle as claimed in claim 2, which includes two said load bearing members having contact surfaces which slope downwardly and laterally outwardly toward the travel surface adjacent each side of the vehicle.

4. An automotive vehicle as claimed in claim 3 in which each load bearing member is mounted for rotation about an axis generally transverse to the center line of the vehicle and means is provided for driving said load bearing members.

5. An automotive vehicle as claimed in claim 2 in which said load bearing member is mounted for rotation about an axis generally transverse to the center line of the vehicle and means is provided for driving said load bearing member in the same direction as said drive members.

6. An automotive vehicle as claimed in claim 2 in which said load bearing member is mounted for rotation about an axis generally transverse to the center line of the vehicle and means is provided for driving said load bearing member in a direction opposite to that of said drive members.

7. An automotive vehicle as claimed in claim 2 wherein said load bearing member is a pendulum.

8. An automotive vehicle as claimed in claim 2 wherein a plurality of said load bearing members are mounted for rotation about an axis generally transverse to the center line of the vehicle and means are provided for driving said load bearing members at different angular speeds.

9. An automotive vehicle as claimed in claim 1, comprising in addition a trailing support.

10. An automotive vehicle as claimed in claim 9 in which said support comprises a caster wheel.

11. An automotive vehicle as claimed in claim 9 in which said support comprises a skid.

12. An automotive vehicle as claimed in claim 1 wherein said steering means includes first and second longitudinally spaced steering means, and said advanced driving member is raised only when both said first and second steering means simultaneously ride up on said directive variation.

13. An automotive vehicle as claimed in claim 12 further including a second pair of laterally spaced surface contacting drive members spaced longitudinally from said first mentioned pair of drive members, said first steering means controlling said first pair of drive members, said second steering means controlling said second pair of drive members.

14. An automotive vehicle as claimed in claim 1 wherein said geometric directive variation is a guide element loosely resting on said travel surface, and said vehicle includes means for translating transversely of the path of said vehicle, while it is moving, that portion of the guide element immediately behind the vehicle.

15. An automotive vehicle as claimed in claim 1 in combination with a guide element resting upon said travel surface, said guide element providing said directive variation.

16. The combination of claim 15 wherein said guide element includes a circular portion.

17. The combination of claim 15 wherein said guide element includes a Y-shaped portion.

18. An automotive vehicle as claimed in claim 15 wherein said guide element is a single flexible cord resting loosely on the travel surface.

19. An automotive vehicle capable of guiding itself on a travel surface along a geometric directive variation projecting above said surface comprising
drive means for advancing said vehicle along said surface, and steering means having first and second members mounted for rotation about axes generally transverse to the center line of the vehicle, said steering means further including means for coupling said first and second members so that their rotations are interdependent, said members being spaced above said travel surface a distance no greater than the height of said directive variation above said travel surface whereby said members will contact said variation when passing thereover, said members further being structured and arranged so that when said directive variation passes thereunder along most lines parallel to the center line of the vehicle, said variation will contact said first and second members, when they are rotating, at points of different effective peripheral speed, said variation and said members thereby cooperating to create a drag force against said vehicle, said drag force and said drive means in turn cooperating to apply a steering torque to said vehicle.

20. An automotive vehicle as claimed in claim 19 wherein said members each have a tapered portion, said portions tapering in opposite directions.

21. An automotive vehicle as claimed in claim 19 wherein said members each have a tapered portion, said portions tapering in the same direction but having different slopes.

22. An automotive vehicle as claimed in claim 19 wherein said drive means includes a driven tailwheel coupled to the front of the vehicle through a driving tongue, said coupling allowing said tongue to rotate relative to said vehicle in at least a plane parallel to the travel surface.

23. An automotive vehicle capable of guiding itself on a travel surface along a geometric directive variation projecting above said surface, comprising
drive means for advancing said vehicle along said surface, including
a pair of laterally spaced drive members having normal effective driving modes,
and steering means attached to the vehicle and having a portion spaced above said travel surface a distance less than the height of said variation above said surface to ride up on said variation when the lateral displacement of the vehicle therefrom exceeds a limiting value and to thereby alter the effective driving mode of at least one of said drive members by lifting a portion of said vehicle relative to said surface, thereby to initiate the turning of the vehicle toward the variation.

24. An automotive vehicle capable of guiding on a travel surface along a geometric directive variation projecting above said surface, comprising
drive means for advancing said vehicle along said surface, and
steering means attached to the vehicle and having a portion spaced laterally of the vehicle center line and spaced above said travel surface a distance no greater than the height of said directive variation above said travel surface whereby said steering means will contact said variation when passing thereover to produce a drag force on said vehicle, said steering means being coupled to said vehicle to apply said drag force to said vehicle at a point spaced laterally of the vehicle center line in response to deviation of the vehicle's path from said variation to thereby retard the movement of said side of the vehicle and to initiate the turning of the other side of said vehicle toward the variation.

25. The vehicle of claim 24 wherein said steering means is sensitive to the amount by which said limiting value is exceeded and causes said drag force to increase with said amount.

26. The vehicle of claim 24 wherein said vehicle rotates toward said variation during said turning, said drag creating means is sensitive to the angular orientation of said vehicle to said variation during said turning, and said drag creating means ceases to apply said drag when said orientation assumes a predetermined state.

27. The vehicle of claim 24 further including means for aligning said vehicle angularly with said variation during said turning.

28. An automotive vehicle capable of guiding itself on a travel surface along a directive variation in the coefficient of friction of said surface, comprising
drive means, including a pair of laterally spaced surface contacting members at least one of which has a surface contacting area that is elongated in a direction generally transverse to its direction of advance, for advancing said vehicle along said surface, and for responding to changes in the transverse displacement of said vehicle from said variation to produce changes in the net friction between said surface contacting area and said travel surface to change the effective driving mode of said one member to reverse said changes in said transverse displacement.

29. The vehicle of claim 28 wherein said one member is mounted for rotation about an axis at an acute angle to the direction of vehicle advance, said member being elongated along said axis.

30. The vehicle of claim 28 wherein said directive variation comprises a frictional interface on a waxed travel surface between buffed and unbuffed zones, and said one member has a surface contacting said travel surface suitable for buffing said unbuffed zone.

31. An automotive vehicle capable of guiding itself on a travel surface along a geometric directive variation projecting above said surface, comprising a pair of laterally spaced apart surface contacting drive members, and means for driving both of said members, a first of said drive members being mounted for rotation in contact with said variation, said first member having portions of different diameters with corresponding different effective driving speeds spaced along its axis of rotation, the other of said drive members having a generally constant effective driving speed for all positions of said first member relative to said variation, said constant speed being between the minimum and maximum effective driving speeds of said first member.

32. The vehicle of claim 31 wherein said first member has a conical surface.

References Cited

UNITED STATES PATENTS

| | | | |
|---|---|---|---|
| 2,824,616 | 2/1958 | Knight | 180—79 |
| 3,083,503 | 4/1963 | Zalkind | 180—79.1 X |
| 3,130,803 | 4/1964 | Wiggins | 180—79.1 X |

BENJAMIN HERSH, *Primary Examiner.*

J. A. PEKAR, *Assistant Examiner.*